United States Patent [19]

Hoffmann

[11] Patent Number: 4,845,721
[45] Date of Patent: Jul. 4, 1989

[54] SOLID STATE LASER RODS FOR HIGH POWER CONDITIONS

[75] Inventor: Hans-Juergen Hoffmann, Mainz, Fed. Rep. of Germany

[73] Assignee: Schott Glaswerke, Mainz, Fed. Rep. of Germany

[21] Appl. No.: 946,730

[22] Filed: Dec. 29, 1986

[30] Foreign Application Priority Data

Dec. 28, 1985 [DE] Fed. Rep. of Germany ....... 3546280

[51] Int. Cl.⁴ .............................................. H01S 3/04
[52] U.S. Cl. ...................................... 372/34; 372/35; 372/61; 372/66
[58] Field of Search ................. 372/61, 66, 68, 34, 372/35, 69

[56] References Cited

U.S. PATENT DOCUMENTS

| | | | |
|---|---|---|---|
| 3,297,957 | 1/1967 | Merkl. | |
| 3,467,916 | 9/1969 | Ley et al. | 372/66 |
| 3,530,397 | 9/1970 | Suzuki et al. | 372/66 |
| 3,683,296 | 8/1972 | Scalisi | 372/66 |
| 3,684,980 | 8/1972 | Kay | 372/66 |
| 3,725,813 | 4/1973 | Yasuda et al. | 372/61 |
| 3,763,442 | 10/1073 | McMahan. | |
| 3,891,945 | 6/1975 | Schlossberg et al. | 372/66 |
| 4,150,341 | 4/1979 | Ferguson | 372/35 |
| 4,528,671 | 7/1985 | Robbins | 372/66 |
| 4,567,597 | 1/1986 | Mandella | 372/66 |
| 4,589,118 | 5/1986 | Suzuki et al. | 372/69 |

FOREIGN PATENT DOCUMENTS 1136098 12/1968 United Kingdom.

*Primary Examiner*—Leon Scott, Jr.
*Attorney, Agent, or Firm*—Millen, White & Zelano

[57] ABSTRACT

A solid state laser comprises a laser element formed from crystalline, ceramic, glass ceramic, glass, or plastic material in the configuration of a rod or slab. The cooling capabilities of the rods or slabs are improved by the provision of internal bores or slots through which a coolant can flow, and/or by the provision of a modified cross-sectional profile whereby the cooling surface is increased and the distance between the interior regions of the rod or slab and the cooling surface is reduced. Alternatively, the cooling capacity of the laser system is improved by providing a rotating arrangement of laser material wherein only specific portions of the laser materials are subjected to pumping while other portions are cooling.

9 Claims, 5 Drawing Sheets

LASER ROD

SOLID STATE LASER RODS FOR HIGH POWER CONDITIONS

BACKGROUND OF THE INVENTION

In solid state laser oscillators and amplifiers (in a word, solid state lasers) the active medium or material comprises crystals or glasses in the form of rods and slabs.

Laser rods are conventionally shaped as longitudinally extending cylindrical elements having a circular or regular polygonal cross-sectional profile. Laser slabs are generally in the form of planar, square or rectangular elements or parallelepipeds.

Ions and atoms capable of fluorescence are incorporated in these materials. These ions or atoms are stimulated ("pumped") so that an electron population inversion between two energy levels exists, which is used for the laser emission. Pumping is generally done by gas discharge lamps, flash lamps, other lasers or also light emitting diodes. During the pumping, the active solid state laser materials are heated due to a variety of energy transfer effects. Due to this heating effect, the laser rods or slabs must be cooled when under conditions of high pumping in order to prevent their destruction. For this reason the laser rods or slabs are positioned in flowing coolants. In addition, with large pumping powers, very high temperature gradients occur in the rods or slabs as a result of which the quality of the laser beam becomes poorer, even at temperatures below the destruction threshold.

Because of these thermal loads the maximum attainable average powers of the solid state lasers are predetermined and their use possibilities are limited. From U.S. Pat. No. 3,297,957 and Swiss patent CH 597 701 it is known that grooves which encircle a laser rod normal to its axis can improve the overall efficiency of such a laser: The pumping efficiency can be increased and the detrimental effects of the whisper modes can be reduced. These grooves, however, do not improve the cooling of the active medium of the solid state lasers, which is the primary object of the present invention to be described in the following.

SUMMARY OF THE INVENTION

It is an object of this invention to provide solid state lasers for which the adverse effects of thermal load are reduced and therefore have a wider range of applications than the prior art solid state lasers.

Upon further study of the specification and appended claims, further objects and advantages of this invention will become apparent to those skilled in the art.

These objects are attained by special shapes and arrangements of the active laser material, as a result of which the laser can be more effectively cooled by a coolant. The laser materials according to the invention can be pumped with greater power and the average optical power of the laser systems can be considerably increased without the active material being destroyed or the beam quality, in comparison with already available solid state lasers, becoming worse. Conversely, when using a solid state laser according to the invention at the same pumping power normally used with the solid state lasers of the prior art, the beam quality, especially the divergency, is improved.

The shapes and arrangement of laser material according to the invention are especially advantageous in the case of glass lasers. Heretofore, glasses having a large volume of active material could not be successfully subjected to a high repetition or frequency of laser pulses or be subjected to a higher level of continuous power because of their by far smaller heat conductivity as compared with crystals According to this invention, the thermal load experienced by solid state lasers can be reduced on the basis of the following requirements for shape and design of the active medium:

(a) enlargement of the surface area for cooling and reduction of the distance between the inner areas of the laser rod or slab and the cooling surface, (b) shortening of the action period of the thermal load on a given volume element of the active medium and distribution of the heating and cooling effects over a larger volume by sequentially subjecting only sections or parts of the active laser medium to the pumping action rather than the entire volume at once, (c) use of mechanically sufficiently stable active material.

To be able to meet these requirements, the geometric configuration used up to now, i.e., a single cylindrical laser rod or laser slab had to be abandoned and other geometric configurations and arrangements of the active laser medium found. Examples are described below in which the above-mentioned requirements were advantageously taken into account.

BRIEF DESCRIPTION OF THE DRAWINGS

Various other objects, features and attendant advantages of the present invention will be more fully appreciated as the same becomes better understood when considered in connection with the accompanying drawings wherein:

FIGS. 1–4 illustrate laser rods which possess a modified cross-sectional profile as compared to the circular cross-sectional profile of the conventional laser rod. In each of the embodiments illustrated in FIGS. 1–4, the cross sectional profile is modified in such a manner that, in comparison to a conventional laser rod having the same cross-sectional surface area, the laser rods according to the invention have a greater cooling surface area and the longest distance between an interior point and the closest cooling surface is reduced. In the examples of FIGS. 1–3 the coolant flows around the exterior of the rod. In FIG. 4 coolant can flow through the interior of the rod as well as around the exterior.

FIG. 1, illustrates a star-shaped cross-sectional profile having an inner diameter, an outer diameter, and radial arms or teeth which extend from the inner to the outer diameter. The inner and outer diameters are concentric with the longitudinal axis of the rod. FIG. 2 shows a similar cross-sectional profile in which the radial arms have a more rounded exterior surface. FIG. 3 illustrates an embodiment having four radial arms which are each further divided into radial segments. Using the rod shape of FIG. 1 as an example, if the inside radius of the star-shaped cross section, r, is chosen to be 2 mm, the height of the teeth of the star, h, is chosen to be 3.2 mm, then the maximum distance from any interior point to the surface is 2 mm. A cylindrical laser rod of the same cross section surface area would have a radius of 4 mm (The width, w, of the teeth is chosen to be 2 mm, in the figure.) Therefore, in the example of the configuration according to FIG. 1, the distance between the cooling surface and those areas inside the rod which are the farthest away from the surface is more favorable (i.e., shorter) by a factor of 2 in comparison with the traditional cylindrical configuration. Accordingly, the cooling is improved by a factor of similar magnitude. The cooling capabilities of the rods can also be improved by modification of the dimensions of the rods and by alternative geometric configurations of the cross-sectional profile such as illustrated in FIGS. 2 and 3.

FIG. 4 shows the cross-sectional profile of a rod having a generally cylindrical exterior surface and which is provided with inside longitudinal bores for the passage of coolant. The coolant can flow in and out of the rod, e.g., through the end surfaces or through lateral additional bores (not shown) which communicate with the internal longitudinal bores. The cross-sectional profile of the rod along its longitudinal rod axis does not change or does so only slightly, since the electromagnetic wave will run almost parallel to this axis. However, if the cross section of the electromagnetic wave is changed, e.g., as a result of resonator mirrors with finite focal length, an adaption of the rod profile along the longitudinal axis can be advantageous.

In FIG. 5 a laser rod is illustrated in which the coolant can flow through cooling slots in the laser rod crosswise to its longitudinal axis. In the embodiment illustrated in FIG. 5, the slots are perpendicular with respect to the longitudinal axis. The cooling capacity of the arrangement illustrated in FIG. 5 is particularly effective as a result of its laminated design. The laminated design is suitable not only for the illustrated circular or rectangular cross sections but for any shape, and especially for the slab laser wherein the laser beam is guided zigzag in the medium parallel to the active layers.

FIGS. 6-11 illustrate another modification of the solid state laser according to this invention. In each of the embodiments illustrated in FIGS. 6-11, the laser material is circumferentially arranged about a longitudinal axis and the material is capable of being rotated about this longitudinal axis to bring a portion of the material into the region of the pumping source so that the portion can be thereby stimulated. The embodiments illustrated in FIGS. 6-11 provide for shortening of the action period of the thermal load during pumping and distribute the effects of heating and cooling over larger volumes of active laser material. These embodiments are capable of increasing pulse repetition frequency by sequentially rotating sections of laser rod into the region of the optical laser resonator or laser amplifier wherein the laser sections are subjected to pumping.

FIG. 6 illustrates a system wherein a plurality of generally parallel longitudinally extending rods are arranged circumferentially about an axis. Although four rods are shown in the drawing, any number of two or more rods can be employed. In the illustrated case of a four rod system, the average beam power of the system (in comparison with a single rod system) can be increased by a factor of 4 by rotating a cold rod into the resonator or amplifier after each laser pulse or after a predetermined number of laser pulses. In such an arrangement, a hot laser rod can then cool off while the cold rods are sequentially rotated into the resonator or amplifier during the remaining three cycles. Of course, a much greater number of laser rods can be used, as a result of which the maximum pulse frequency and the average beam power can be considerably increased in comparison with the prior art. The potential pulse repetition frequency and average beam power will increase in proportion to the number of laser rods present. Although it is true several laser rods are needed for this system, from an economical viewpoint the arrangement is not disadvantageous because only one set of flash lamps or in other words, only one pumping source is needed for the entire system. In FIG. 6 only one flash lamp is shown, however, several flash lamps can also be coupled for more effective pumping. Alternatively, light-emitting or laser diodes or other lasers can be employed according to known standard techniques for pumping of the laser rods. The rotation of the laser rod arrangement can be provided by an external motor or can also be driven by the inflow or outflow of the coolant. The latter can be achieved in the following way: The blades of a turbine or of a propeller are fixed both to the rotation axle and to the laser rod arrangement. If the cooling medium (e.g. air or water) is flowing e.g. parallel to the rotation axis, the turbine is driven. Consequently, the laser rod arrangement is forced to revolve, since it is fixed to the blades of the turbine.

Changing and pumping of the laser rods must be sufficiently synchronized. However, the need for synchronization can even be eliminated, if, in the limiting case, a laser tube such as represented in FIG. 7 is used rather than a rotating arrangement of laser rods.

Figure 7:
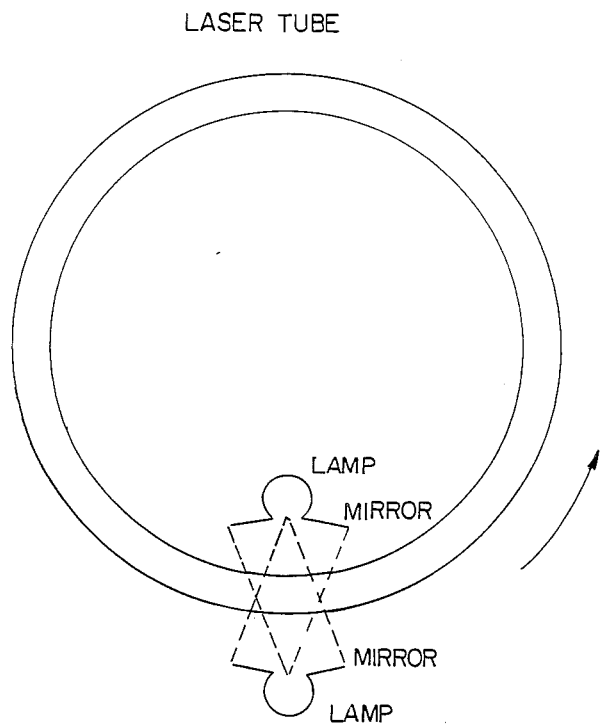
FIG. 7 illustrates a hollow laser tube which is rotatable so that only certain portions of the tube are subjected to stimulation by pumping lamps.

In FIG. 7 a hollow cylindrical laser tube is shown wherein a part of the tube, i.e. that which is shaded, is stimulated by two pumping sources, e.g, two lamps. The pumping sources are arranged so that in each case only that part of the tube which is between the two resonator mirrors, or is at the necessary site in the laser amplifier, is stimulated by pumping light. Coaxial stimulation is also possible if a laser mirror which is transparent for the pumping light but acts as a mirror for the laser beam is used. If the tube during its rotation around the axis of symmetry is pumped with sufficient power, a high power laser beam can be produced which up to now it was not possible to attain. This high power laser beam is made possible because cooling of the tube is effectively distributed over the entire tube wall, while only a fraction of the tube is at any one time heated during pumping. For example, if the diameter of a single laser rod is 8 mm and the circumference of a laser tube is 320 mm with 8 mm wall thickness, a reduction of the thermal load by more than an order of magnitude is possible. This means that a laser system having a rotating tube-shaped active medium according to the invention can deliver an average beam power higher by more than an order of magnitude than an individual laser rod experiencing the same amount of thermal load.

Figure 8:
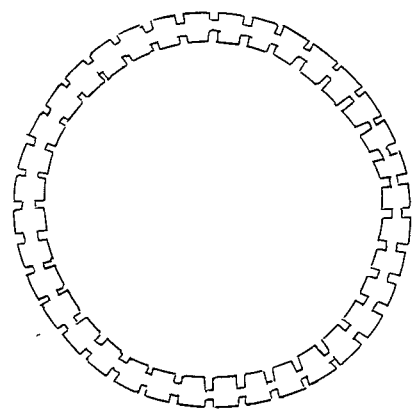
FIGS. 8–10 show laser tubes similar to that of FIG. 7 but with modified cross-sectional profiles.
Figure 9:
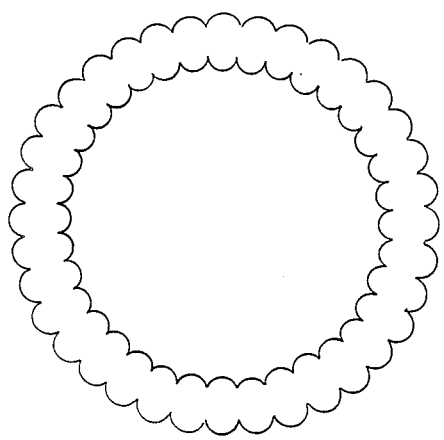
Figure 10:
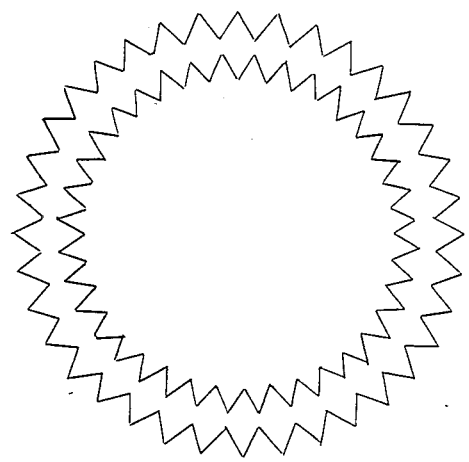
Figure 11:
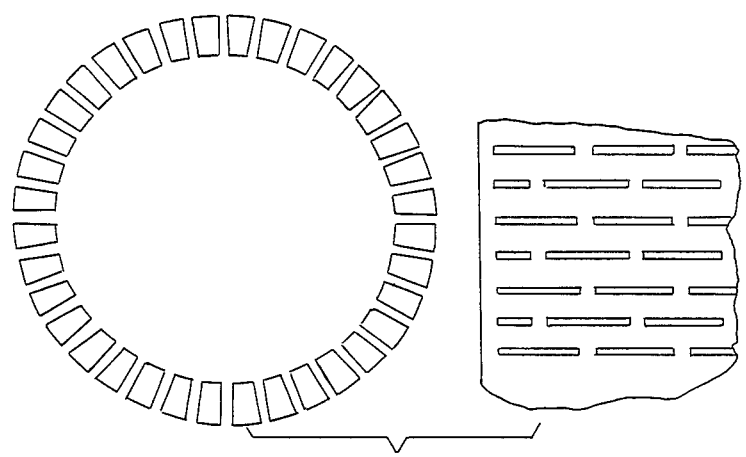
FIG. 11 illustrates a laser tube having internal coolant passages.

Cooling of a rotating tube can be further improved by modifying the cross section profiles so as to increase the surface area of the tube such as illustrated in FIGS. 8, 9, and 10. A particularly advantageous improvement in cooling can be attained by providing slots which run parallel to the axis of symmetry in the tube wall (see FIG. 11 in analogy to FIG. 5 for the laser rod), through which the coolant can flow from the inside to the outside or vice versa.

In all the systems discussed herein the coolant does not necessarily have to be liquid (e.g., water). Rather, cooling also can be performed with any fluid, e.g., gas, e.g., purified air can be blown along the laser rod or through the laser rod by a blower.

In each of the embodiments illustrated in the Figures it can be advantageous for the longitudinal end surfaces of the rods or slabs to be covered with layers which are highly reflective or partially reflective with respect to the laser wavelengths.

Figure 1:
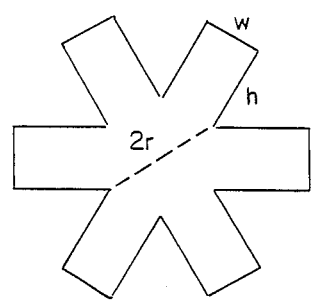
FIGS. 1–4 show examples for the cross section of the laser rods, in which the ratio of cooling surface to volume is greater than in the traditional cylindrical laser rods.
Figure 2:
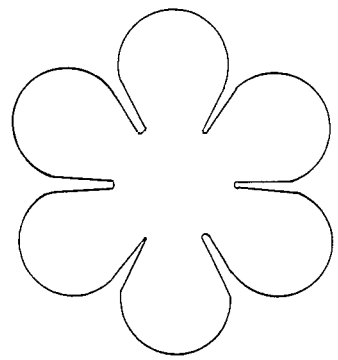
Figure 3:
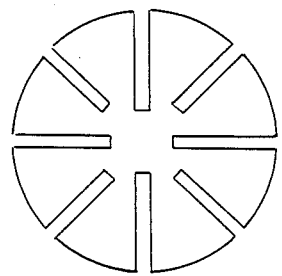
Figure 4:
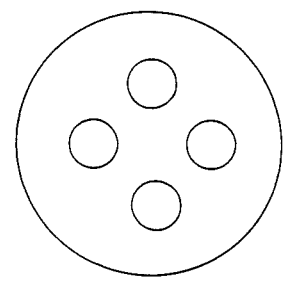
Figure 5:
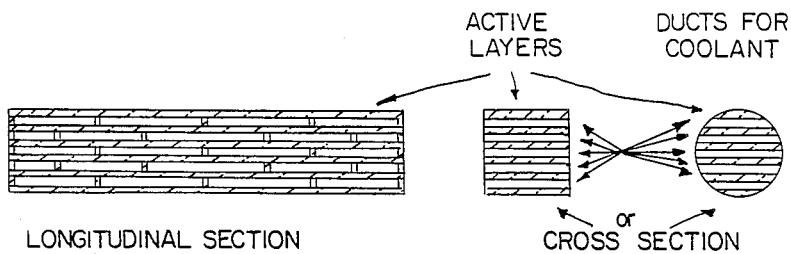
FIG. 5 shows a longitudinal section and two alternative cross sections of a laser slab or rod provided with cooling passages for coolant to flow through the solid state laser.
Figure 6:
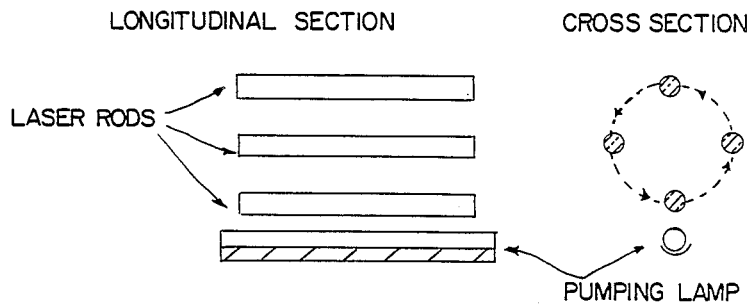
FIG. 6 illustrates a longitudinal section and a cross section of a laser device having a plurality of rods which sequentially rotate into a field influenced by a pumping lamp.

All the profiles and shapes described for the laser rods, slabs, and tubes can be produced by known techniques (e.g. drilling, grinding, ultrasound drilling, gluing, soldering, or fusion) from larger pieces of raw materials. In the case of glass, the corresponding profiles of the rods and tubes can also be produced by hot-pressing and extrusion. The laminated design of laser rods and laser slabs as shown in FIG. 5 can be produced not only by ultrasound drilling but also by gluing together, (glass) soldering or fusion of thin laser slabs into a slab stack with narrow webs between the individual laser slabs.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A solid state laser comprising a laser element formed from crystalline, ceramic, glass, or plastic material, said element having a longitudinal axis and a cross-section normal to said longitudinal axis, a pumping source for stimulating said element and coolant delivery means for contacting said element with a coolant, said coolant delivery means being in fluid communication with internal fluid passageways within said element through which a coolant may flow.

2. A solid state laser according to claim 1 wherein said fluid passageways comprise parallel longitudinal bores.

3. A solid state laser according to claim 1, wherein said fluid passageways comprise lateral cooling slots which are crosswise with respect to the longitudinal axis of the element.

4. A solid state laser according to claim 3 wherein said lateral cooling slots are perpendicular to the longitudinal axis of the element.

5. A solid state laser according to claim 3 wherein said rod has a generally rectangular cross section.

6. A solid state laser according to claim 3 wherein said rod has a generally circular cross section.

7. A solid state laser according to claim 1 wherein said element is provided with layers reflective with respect to the laser wavelength on the longitudinal ends thereof.

8. A solid state laser according to claim 4, wherein said element has a tubular shape and is rotatable about its longitudinal axis whereby only a limited portion of said material is subjected to stimulating from a pumping source at any one time.

9. A solid state laser according to claim 8, wherein said element is provided with layers reflective with respect to the laser wavelength on the longitudinal ends thereof.

* * * * *